(12) United States Patent
Bureacov

(10) Patent No.: US 10,705,308 B1
(45) Date of Patent: Jul. 7, 2020

(54) OPTIC FIBER BREAKOUT ASSEMBLY WITH BONDED TUBE ASSEMBLY AND METHODS AND APPARATUS FOR MANUFACTURING THE SAME

(71) Applicant: AFL IG LLC, Kent, WA (US)

(72) Inventor: Artur Bureacov, Tacoma, WA (US)

(73) Assignee: AFL IG LLC, Kent, WA (US)

( * ) Notice: Subject to any disclaimer, the term of this patent is extended or adjusted under 35 U.S.C. 154(b) by 0 days.

(21) Appl. No.: 16/151,315

(22) Filed: Oct. 3, 2018

Related U.S. Application Data

(60) Provisional application No. 62/567,304, filed on Oct. 3, 2017.

(51) Int. Cl.
*G02B 6/44* (2006.01)
*G02B 6/36* (2006.01)

(52) U.S. Cl.
CPC ......... *G02B 6/4471* (2013.01); *G02B 6/3616* (2013.01)

(58) Field of Classification Search
CPC .......................... G02B 6/4471; G02B 6/3616
USPC .......................................................... 385/24
See application file for complete search history.

(56) References Cited

U.S. PATENT DOCUMENTS

2015/0362690 A1* 12/2015 Harwath ........... B29D 11/00711
385/102
2016/0184045 A1* 6/2016 Henriques Martins ....................
A61B 1/0011
362/556

\* cited by examiner

*Primary Examiner* — Jerry M Blevins
(74) *Attorney, Agent, or Firm* — DWC Law Firm, P.S.

(57) ABSTRACT

A breakout assembly for use in furcating optic fibers, the breakout assembly including a finished furcation tube assembly having inner tubes and strength filaments having been bonded together using a bonding substance to form a bonded portion, the bonded portion being connectable to a housing of the breakout assembly for simultaneously anchoring both the tubes and strength filaments of the furcation tube assembly to the housing.

6 Claims, 6 Drawing Sheets

OPTIC FIBER BREAKOUT ASSEMBLY WITH BONDED TUBE ASSEMBLY AND METHODS AND APPARATUS FOR MANUFACTURING THE SAME

CROSS-REFERENCE TO RELATED APPLICATION(S)

This application claims the benefit of U.S. provisional patent application No. 62/567,304, filed Oct. 3, 2017, which is incorporated herein by reference in its entirety.

BACKGROUND

Technical Field

The present disclosure relates to optic fiber breakout assemblies, and also in particular, to a finished furcation tube assembly usable in a breakout assembly, the finished furcation tube assembly being formed by bonding and/or adhesive to provide a substantially fixed arrangement (array) of tubes bonded to strength filaments, and therefore attachable directly to a breakout assembly housing for anchoring the strength filaments to the housing.

Description of Related Art

Fiber optic cables are frequently used for interconnecting computer systems (e.g., servers) because these cables can simultaneously carry a large amount of data without excessive transmission loss. A trunkline is a type of fiber optic cable that typically includes multiple optic fibers and strength filaments (e.g., Kevlar yarns or filaments) arranged lengthwise and encased in a protective jacket (e.g., plastic or metal tubing). At each end of the trunkline, the optic fibers are furcated into individual cables that terminate at individual connectors. Providing the junction between the trunkline and individual furcation cables is time consuming and difficult to achieve without compromising optic fiber integrity and protection.

U.S. Pat. No. 7,494,284 (Robinson, et al), which is incorporated herein by reference in its entirety, addresses furcating methods and devices. For example, a housing is provided wherein a cable filament and optic fiber extend from the end of a cable jacket into an interior space of the housing, and wherein the optic fiber is longitudinally movable in the interior space relative to the housing. The housing includes an anchor extending from an internal surface thereof and the cable filament wraps around at least a portion of the anchor and extends through an opening to be external to the housing.

U.S. Patent Application Publication No. US20170336568, which is incorporated herein by reference in its entirety, discloses methods and apparatus for furcating optic fiber cables. In some embodiments, a molded furcation tube array is generated by compressing a plurality of furcation tubes together, and heating at least a portion thereof to form a molded furcation tube array. Reinforcing filaments can be bonded into and/or through the molded portion. The molded portion can have internal chambers in which optic fibers can be slidably retained, and the molded portion can be fixedly coupled to a housing, which in turn, can be coupled to a cable trunkline. Optic fibers can piston longitudinally within the trunkline, housing, and molded portion to reduce the likelihood of damaging the fibers when force is exerted on the furcation tubes and trunkline during installations, maintenance, removals, etc.

BRIEF SUMMARY

In some embodiments of the present disclosure, a breakout assembly comprises a bundle of furcation tubes having tube jackets, inner tubes, and strength filaments, and a rearward end portion stripped of the tube jackets and comprising a portion of the strength filaments and a portion of the inner tubes bound together by a first bonding substance. The first bonding substance is different in composition than the inner tubes or the tube jackets. Also, a housing of the breakout assembly is provided with an interior wall portion to which the rearward end portion is attached by being bonded thereto for simultaneously anchoring the strength filaments and inner tubes to the housing, since the strength filaments and inner tubes have been bonded together. Also, the inner tubes and strength filaments are, in some embodiments, adhere and/or bonded to at least a rearward edge portion of the tube jacket.

Some embodiments of the present disclosure include a method of making a furcation tube assembly, comprising steps (not necessarily in the order described). The steps include stripping rearward end portions of furcation tube jackets from a plurality of furcation tubes to expose portions of strength filaments and portions of a plurality of inner tubes; retaining the furcation tubes together in a plurality of sub-bundles using tape, each sub-bundle comprising at least two rows of furcation tubes; cutting the exposed portions of strength filaments to shorten lengths thereof; arranging, and retaining the exposed portions of the plurality of inner tubes in grouped individual rows that correspond to the rows of the furcation tubes of the plurality of sub-bundles; stacking the sub-bundles together in a single assembled bundle and coupling the stacked sub-bundles together; applying a first bonding substance to the exposed portions of strength filaments and the exposed portions of the plurality of inner tubes to form a bonded tube portion; covering the bonded tube portion with a flexible member; pressing the bonded tube portion into a forming tool to shape the bonded tube portion; removing the forming tool from the bonded tube portion; removing the flexible member from the bonded tube portion; trimming the bonded tube portion; threading optic fibers into the inner tubes in the bonded tube portion; and coupling the bonded tube portion to a housing.

DETAILED DESCRIPTION

In the present description, certain specific details are set forth in order to provide a thorough understanding of various embodiments of the disclosure. However, upon reviewing this disclosure one skilled in the art will understand that the various embodiments disclosed herein may be practiced without many of these details.

In the present description, the terms "a" and "an" refer to "one or more" of the enumerated components. The use of the alternative (e.g., "or") should be understood to mean either one, both, or any combination thereof of the alternatives. As used herein, the terms "include," "comprise," and "have" are used synonymously, which terms and variants thereof are intended to be construed as non-limiting. In the present disclosure and in any appended materials, to the extent the terms "about" and "approximately" are used, they mean ±25% of the indicated range, value, or structure, unless otherwise indicated. The definitions in this paragraph are intended to apply throughout this disclosure unless otherwise expressly stated.

Various embodiments in this disclosure are described in the context of use with fiber-optic cables of a particular configuration/construction. However, as will be appreciated by those skilled in the art after reviewing this disclosure, various other structures/configurations for fiber optic cables may be suitable for use with the apparatus, systems and methods disclosed herein, which may be modified in the spirit of this disclosure to fit such various structures/configurations.

Figures 1, 2:
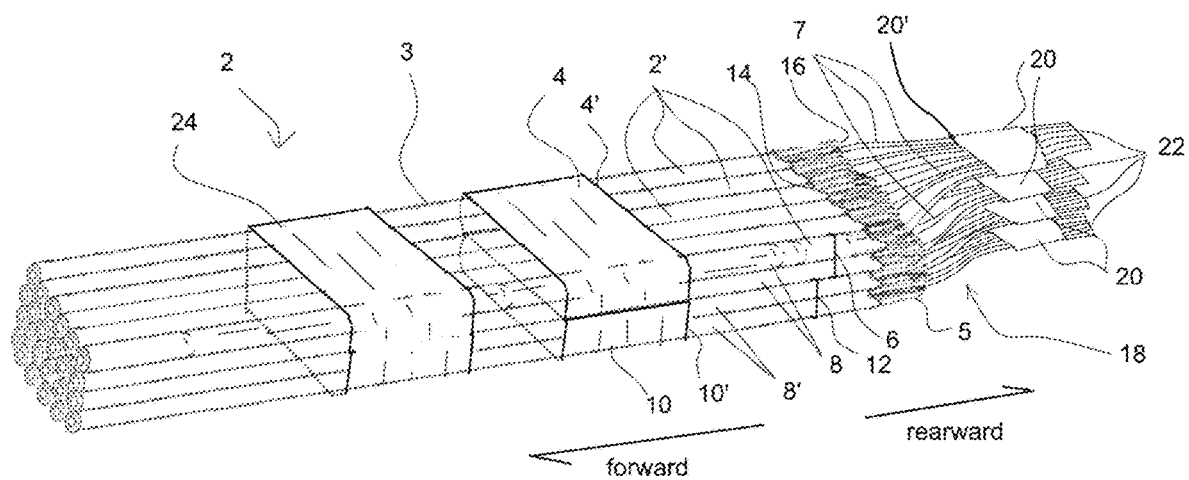
FIG. 1 is a perspective view of a furcation tube assembly of the present disclosure in the process of being assembled.
FIG. 2 is the furcation tube assembly of FIG. 1, further comprising additional tape wound about the rearward taped portion of FIG. 1, and the forward taped portion of FIG. 1.

In some embodiments, the methods and components of the present disclosure comprise the following:

A furcation tube assembly 2, as shown in FIG. 1, is in the process of assembly, and comprises furcation tubes 2' that are linearly aligned and separated into layers by stacking and taping to form an array. As will be appreciated by those skilled in the art upon reviewing this disclosure, each furcation tube 2' can include a tube jacket 3, strength filaments 5 and an inner tube 7. In the furcation tube assembly 2 as illustrated, a first strip of tape 4 has been applied to wrap a first sub-bundle 6 of the furcation tube assembly 2, the sub-bundle including two (2) layers 8 of stacked tubes, with six (6) furcation tubes 2' disposed in snug side-by-side parallel fashion (e.g., touching in all or some locations) in each layer 8. In other embodiments, six, or more than six furcation tubes 2' or less than six furcation tubes 2' can be in each layer 8, and the sub-bundle 6 can comprise of two layers, or more or less than two layers. A second strip of tape 10 has also been applied to wrap a second sub-bundle 12 of the furcation tube assembly 2, the second sub-bundle 12 also including two (2) layers 8' of furcation tubes 2', with six (6) such furcation tubes arranged in a row in each layer, similar to the first sub-bundle 6. Also, like the first sub-bundle, the second sub-bundle is not limited by the number of tubes per layer, or the number of layers.

(Note that throughout this disclosure, unless the context expressly indicates otherwise, "rearward" refers to a direction moving toward the rearward end of the tube assembly as indicated and visible in the FIG. 1, as shown by arrow "rearward," and "forward" refers to the opposite direction shown by arrow "forward." As will be appreciated, the forward portion of the furcation tube assembly 2 can be long or short, relatively speaking, sufficient to route optic fibers threaded therethrough from a furcation breakout assembly to the desired location, and the length of the forward portion past what is shown in FIG. 1 is not limited by this disclosure, and the length can be selected as desired for use in the environment.)

In FIG. 1, the furcation tube assembly 2 has been assembled such that the tube jackets 3 of the sub-bundles 6 & 12 have been stripped away from a rearward end portion 18 of each of the furcation tubes 2', to expose the strength filaments 5 and inner tubes 7. Also the exposed strength filaments (e.g., Kevlar yarn) have been cut back until they extend only partially rearward along the inner tubes 7. That is, for example, in some embodiments, and without limitation, after the outer tube jackets 3 have been stripped from the rearward end portion 18 starting from the cut edge 14, the strength filaments 5 have been cut back to extend an average of about 0.3 inches rearward from the cut edge 14 of the tube jackets 3, while the inner tubes 7 extend rearward about 2 inches from the cut edge 14 (when linearly extended), or about 2 inches from the rearward end 16 of the strength filaments 5. In some embodiments, the filaments will extend less than or greater than 0.3 inches rearward, and the inner tubes will extend rearward less than or greater than 2 inches from the cut edge.

In some embodiments, edges of the tape strips 4 & 10 used to wrap and retain the sub-bundles 6,12 are placed on the furcation tubes 2' at a location wherein a rearward edge of the tape strips 4', 10', is positioned approximately two (2) inches forward from the cut edge(s) 14 of the outer tube jackets 3. This distance may be greater or less than 2 inches in various embodiments.

In some embodiments, the layered inner tubes 7 of the furcation tubes 2' extending rearward from the interior of the tube jackets 3, rearward out from the cut edge 14, are separated into four layers of six inner tubes 7 each (consistent with the corresponding layers 8, 8' of the sub-bundles 6, 12), and tape strips 20 are applied to each individual layer (row) 22 of the inner tubes 7, in order to retain the individual layers 22 together. In some embodiments, a forward edge 20' of the tape strips 20 is located at about 0.5 inches to 1.0 inch rearward from the cut edge 14 of the tube jackets 3. See, FIG. 1. In other embodiments, the tape strips that hold the inner tube layers are positioned nearer or further away from the cut edge 14. As explained previously, the number of layers of inner tubes can be different for different embodiments as well.

Referring to FIG. 2, in some embodiments, all of the layers of furcation tubes 2' are stacked together to form the furcation tube assembly 2 (e.g., the two separate sub-bundles 6,12 of two layers each) and the sub-bundles are also secured together with i) an additional tape strip 28 applied over, or proximate, the previously applied sub-bundling tape strips 4,10, and ii) another additional tape strip 24 is applied over, or just forward of, the previously applied sub-bundle tape strips 4,10, with the additional tape strips 24 and 28 wrapped about an entire perimeter of the combined sub-bundles, to retain the sub-bundles together as one combined bundle. Moreover, a wrapping tape strip 26 is also applied over the layered inner tubes 7, which were previously taped into individual layers of inner tubes 7 using tape 20. The wrapping tape strip 26 is applied about the entire perimeter of the layers of inner tubes 7, and can be applied over the tape strips 20, as shown in FIG. 20, to secure the individual lawyers of inner tubes 7 together.

The tape strips described above can comprise, for example, Easy Release Tape 3M 2060x0.75. (Note: This stacking configuration is provided for the particular illustrative non-limiting application; however, in some embodiments, there may be more tubes 2' per layer, and/or there can be more layers, as will be understood by those skilled in the art upon reviewing this disclosure).

Figure 3:
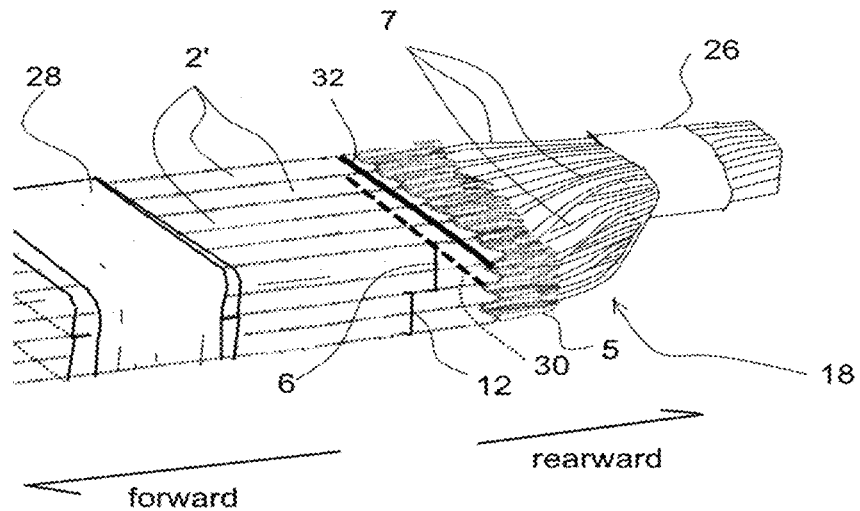
FIG. 3 is a partial view of the furcation tube assembly of FIG. 2, further including adhesive substance applied thereto and as described herein.

In some embodiments, in the process of assembling the furcation tube assembly 2, the sub-bundles 6, 12 are also temporarily manually separated by pushing regions of the stacked sub-bundles 6 & 12 apart from each other laterally to separate them between the tape strips 28, 26, that retain the sub-bundles and inner tube layers together, so that a first adhesive (e.g., glue, or cyanoacrylate adhesive) can be applied, in a line or portion 30 on surfaces of the tube jackets 3 facing each other between the sub-bundles 6 & 12 (e.g., in an interior portion of the furcation tube assembly 2). The adhesive portions 30 can be applied in lines about 3 mm wide (for example only), at a rearward end portions of the tube jacket 3, near the cut edge 14, between the sub-bundles 6,12. See, e.g., FIG. 3. In some embodiments, without limitation, the applied adhesive is SCOTCH ® Super Glue NO RUN GEL by 3M®. Moreover, in some embodiments, the adhesive is also applied in portions 32 on each of the top and bottom facing side of each of the two sub-bundles 6 & 12 as illustrated, again, on the tube jackets 3 near the cut edge 14 (See e.g., FIG. 3, showing the adhesive portion 32 applied on the top facing side of the sub-bundle 6, but not showing the bottom facing side, which is identical or substantial identical to the top facing side in some embodiments).

Figure 4:
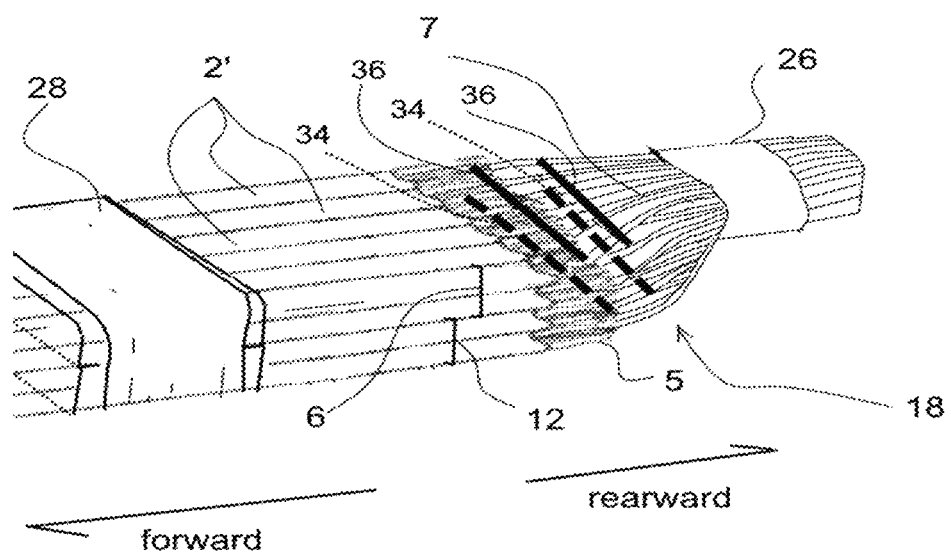
FIG. 4 is a partial view of the furcation tube assembly of FIG. 3, further including bonding substance applied thereto and as described herein.

Also, in some embodiments, when the sub-bundles 6, 12 are temporarily manually laterally pulled (forced) apart between the taped portions 26 & 28 to apply the adhesive (as described above), a bonding substance is also applied directly on the exposed strengthening filaments 5 and exposed inner tubes 7, at opposing facing surfaces between the sub-bundle portions 6 & 12, but rearward of the tube jacket 3 cut edge 14, in order to bond the exposed filaments 5 and exposed inner tubes 7 together in an array/bundle. The bonding substance can be, for example, HERNON®, TUFF-BOND™, two-component epoxy adhesive, grade 302 (with fast room temperature curing of about 5 minutes). In some embodiments, two or more portions 34 (e.g., lines) of the bonding substance are applied on the opposing facing surfaces (described immediately above), and as illustrated in FIG. 4. Also, similar to the application of the adhesive, the bonding substance is also applied on the top side and bottom side of the furcation tube assembly, but this time, in two portions 36 or lines, and this time, on the exposed filaments 5 and inner tubes 7. (See, e.g., FIG. 4, showing top side but not illustrating bottom side, which is identical or substantially similar to the top side in structure and position of application of the bonding portions 36).

Figure 5:
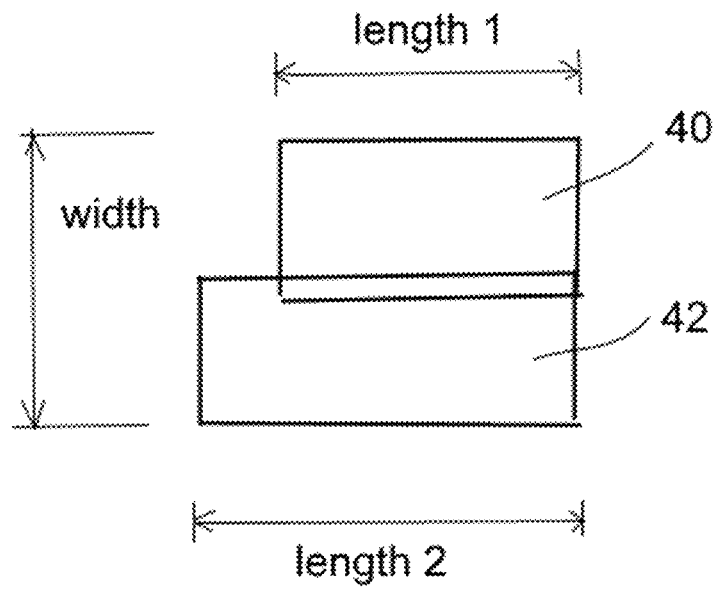
FIG. 5 is a simplified view of a pre-prepared tape structure for use in wrapping about the furcation tube assembly of FIG. 5, namely, after adhesive and bonding substance is applied as illustrated in FIGS. 3 & 4, and so described.
Figure 6:
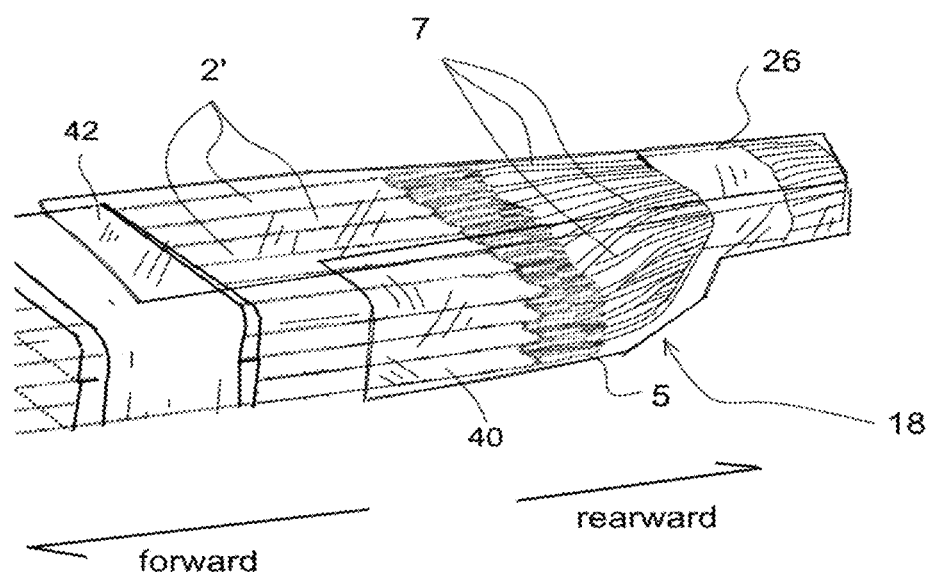
FIG. 6 shows the furcation tube assembly of FIG. 4 with the transparent tape structure of FIG. 5, applied thereto to seal and cover the adhesive and bonding substances applied as described for FIGS. 3 & 4.

Referring to FIG. 6, in some embodiments, strips 40 & 42 of tape, which can be Kapton™Tape 98c-1 are provided (which can be semitransparent or transparent), can be wrapped about a perimeter of the furcation tube assembly 2 during assembly, after it has been bonded with the adhesive (glue) and bonding substance (epoxy) described above. In some embodiments, the two strips 40 & 42 of tap are pre-joined, for example, without limitation, with the example dimensions shown in FIG. 5, their combined width being about 1.8 inches, and with one strip 42 having a length (length 2) of 2.5 inches, and the other strip 40 having a length of (length 1) or 2.0 inches, one strip being longer than the other to assist in removal of the tape in later steps. The tape 40,42 is then wrapped snugly about the bundles, sub-bundles 6 & 12, in the manner show in FIG. 6, to directly and/or indirectly cover the adhesive and bonding substance which was applied as illustrated in FIGS. 3 & 4, while also adhering to surface portions of the tube jackets 3, and other tape strips. This action will serve to, among other things, seal the bonding and adhesive and shield it from contact with a forming tool 46 (described below) to be attached to the furcation tube assembly 2 while the bonding structure and adhesive are in the process of setting.

Figure 7:
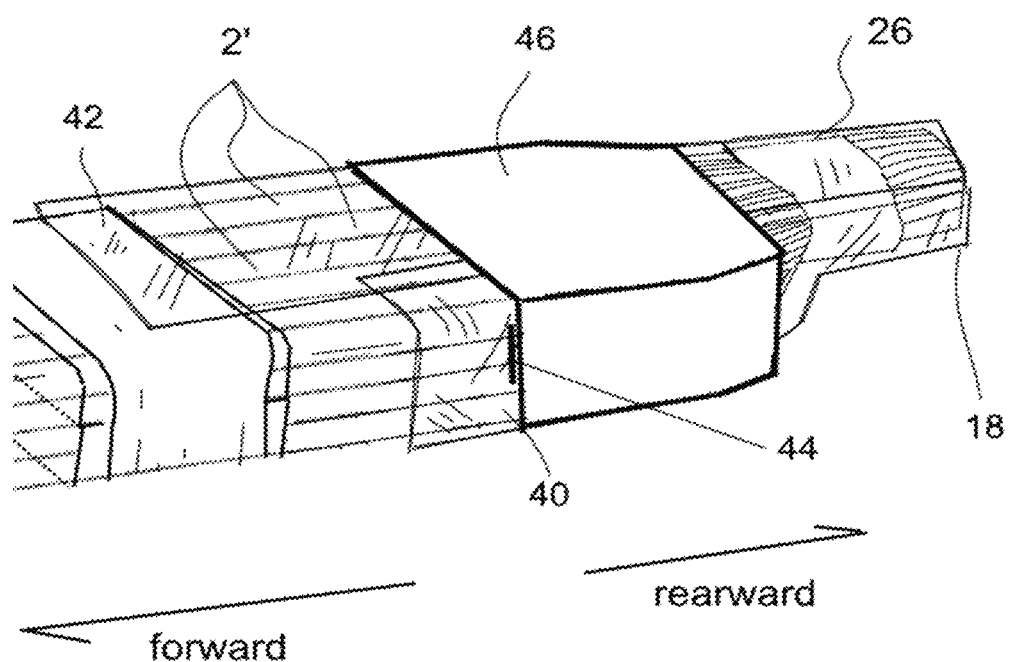
FIG. 7 shows the furcation tube assembly of FIG. 6, further including a forming tool applied thereto to shape the bonded portion thereof.
Figure 8:
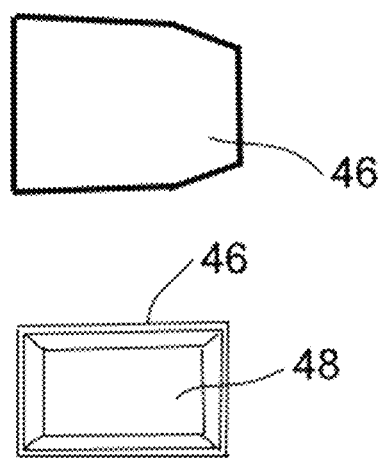
FIG. 8 shows an overhead plan view and front elevation view of the forming tool of FIG. 7.

Referring to FIGS. 7 & 8, in some embodiments, further assembly of the furcation tube assembly 2 includes marking the assembly 2 with a reference line 44 (e.g., using a pen or other marker) for reference when applying a forming tool 46. That is, a reference line 44 can be drawn/marked on the furcation tube assembly 2 comprising the sub-bundles 6, 12, for example, without limitation, at a distance of about 0.3 inches forward (or more or less than 0.3 inches) from the cut edge 14 of the tube jackets 3. A forming tool 46 having an open internal chamber 48, is then slid forward over the rearward end 18' of the bundles to press the bundles (sub-bundles 6,12) into and through the internal chamber 48 of the forming tool, and the forming tool is then pushed forward until a forward edge of the forming tool 46 approximately reaches the reference line 44, as shown in FIG. 7. In some embodiments, the forming tool forms and shapes the bonded bundles of the furcation tube assembly 2 during assembly thereof, so that the shaped portion of the furcation tube assembly 2 can later snugly fit within a housing of a breakout assembly. After a waiting time of about 5 to 20 minutes (or a longer or shorter time in some embodiments), the forming tool 46 is then removed from the bundles, then the tape 40,42 is removed from the bundles as well.

Figure 9:
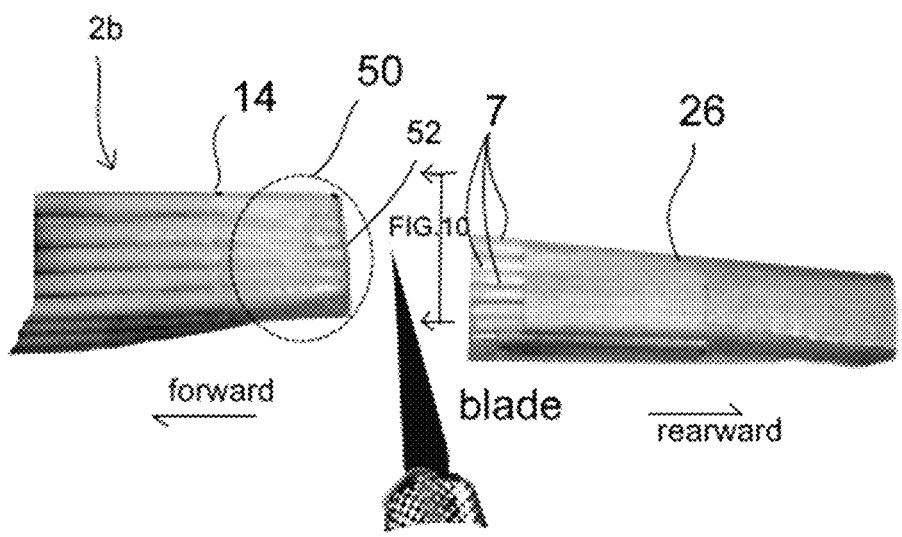
FIG. 9 shows the finished furcation tube assembly, after having removed the forming tool and cut through the bonded portion of the inner tubes.

Referring to FIG. 9, after the forming tool 46 and tape 40,42 is removed, the furcation tube assembly 2 is further trimmed, which can be accomplished by various means, but is illustrated as being cut using a blade. In some embodiments, the cut location 52 is made about 0.4 to 0.6 inches rearward of the cut edge 14 of the tube jackets 3. The portion of the furcation tube assembly rearward of the cut location 52 is disposed of, leaving the bonded portion 50 covering the inner tubes 7. The bonded portion 50 includes the filaments 5 and inner tubes 7 bonded together, by the bonding substance applied earlier as described above.

Figure 10:
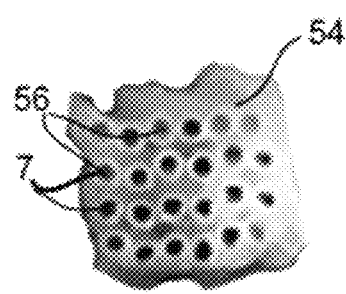
FIG. 10 shows a rear view of the finished furcation tube assembly displaying a organized arrangement of the inner tubes of the bonded portion of the assembly.

The finished furcation tube assembly 2b as shown in FIGS. 9 and 10, is then inspected (e.g., visually), to verify that a stacked tube pattern 54 with inner tube chambers 56 exists with the strength filaments 5 bonded with the inner tubes 7. See, e.g., FIG. 10. Although the inner tubes 7 may not be perfectly aligned within finished furcation tube assembly, a pattern showing in the rearward end openings of the inner tubes 7 should be visually distinguishable, to aid in use of the bonded tube assembly, as will be appreciated by those skilled in the art after reviewing the present disclosure.

Figure 11:
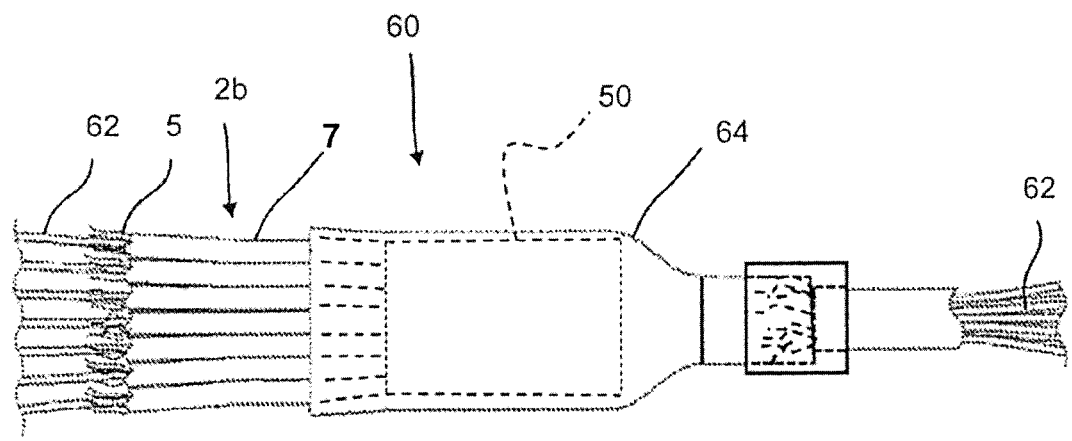
FIG. 11 shows a breakout assembly comprising the finished furcation tube assembly of FIG. 9 bonded to an interior of a housing of the breakout assembly.

Referring to FIG. 11, in use, fiber optic cables 62 can then be passed through a housing 64 of a breakout assembly 60 and threaded into the inner tube openings 7 of the bonded portion 50 of the finished furcation tube assembly. The bonded portion 50 can be directly connected to an interior wall of the housing 64, by adhesion and/or bonding which in turn, will anchor the strength filaments to the housing 64, to allow the fiber optic cables 62 to piston within the inner tubes 7, while the strength filaments absorb pulling forces when the cables/furcation tubes are manipulated during installation, removal, and or maintenance.

After reviewing the present disclosure, an individual of ordinary skill in the art will immediately appreciate that some details and features can be added, removed and/or changed without deviating from the spirit of the invention. Reference throughout this specification to "one embodiment," "an embodiment," "additional embodiment(s)" or "some embodiments," or variations thereof, means that a particular feature, structure or characteristic described in connection with the embodiment(s) is included in at least one or some embodiment(s), but not necessarily all embodiments, such that the references do not necessarily refer to the same embodiment(s). Furthermore, the particular features, structures, or characteristics may be combined in any suitable manner in one or more embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

What is claimed is:

1. A method of making a furcation tube assembly, comprising the following steps not necessarily in the order described:
    stripping rearward end portions of furcation tube jackets from a plurality of furcation tubes to expose portions of strength filaments and portions of a plurality of inner tubes;
    retaining the furcation tubes together in a plurality of sub-bundles using tape, each sub-bundle comprising at least two rows of furcation tubes;
    cutting the exposed portions of strength filaments to shorten lengths thereof;
    arranging, and retaining the exposed portions of the plurality of inner tubes in grouped individual rows that correspond to the rows of the furcation tubes of the plurality of sub-bundles;
    stacking the sub-bundles together in a single assembled bundle and coupling the stacked sub-bundles together;
    applying a first bonding substance to the exposed portions of strength filaments and the exposed portions of the plurality of inner tubes to form a bonded tube portion;
    covering the bonded tube portion with a flexible member;
    pressing the bonded tube portion into a forming tool to shape the bonded tube portion;
    removing the forming tool from the bonded tube portion;
    removing the flexible member from the bonded tube portion;
    trimming the bonded tube portion;
    threading optic fibers into the inner tubes in the bonded tube portion; and
    coupling the bonded tube portion to a housing.

2. The method of claim 1 further comprising binding the tube jackets together using an adhesive substance different from the bonding substance.

3. The method of claim 2 wherein the adhesive substance is a
cyanoacrylate adhesive.

4. The method of claim 2 wherein the first bonding substance is an epoxy
adhesive.

5. The method of claim 1 wherein the flexible member is a prepared tape structure comprising a first strip of tape and a second strip of tape, the strips being coupled together in side by side fashion, with the second strip having a greater length than the first strip.

6. The method of claim 5 wherein covering the bonded portion with the flexible member comprises attaching the prepared tape structure to the bonded portion such that the second strip extends further forward along the furcation tube assembly than the first strip.

* * * * *